US007702324B2

(12) United States Patent
Suzuki et al.

(10) Patent No.: US 7,702,324 B2
(45) Date of Patent: Apr. 20, 2010

(54) INFORMATION TERMINAL CONTROL DEVICE AND METHOD

(75) Inventors: Tomoyuki Suzuki, Machida (JP);
Yoshinosuke Mukou, Tokyo (JP);
Hiroshi Fujimoto, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 735 days.

(21) Appl. No.: 11/489,861

(22) Filed: Jul. 20, 2006

(65) Prior Publication Data
US 2007/0072651 A1 Mar. 29, 2007

(30) Foreign Application Priority Data
Jul. 22, 2005 (JP) ............................ 2005-212856
Apr. 4, 2006 (JP) ............................ 2006-102770

(51) Int. Cl.
*H04M 3/00* (2006.01)
(52) U.S. Cl. .................. 455/420; 455/550.1; 455/569.2
(58) Field of Classification Search .............. 455/550.1, 455/569.2
See application file for complete search history.

(56) References Cited

U.S. PATENT DOCUMENTS

| 7,110,755 | B2* | 9/2006 | Shibasaki et al. ........... 455/420 |
| 2002/0173347 | A1* | 11/2002 | Kinnunen .................... 455/569 |
| 2006/0132924 | A1* | 6/2006 | Mimran ..................... 359/630 |
| 2007/0164104 | A1* | 7/2007 | Dulgerian et al. ........... 235/382 |

FOREIGN PATENT DOCUMENTS

| CN | 1444139 A | 9/2003 |
| CN | 1462141 A | 12/2003 |
| JP | 2003-174676 | 6/2003 |

* cited by examiner

Primary Examiner—Lester Kincaid
Assistant Examiner—Isaak R Jama
(74) Attorney, Agent, or Firm—Young Basile

(57) ABSTRACT

An information terminal controller and an information terminal control method for controlling usually wireless information terminals allows easy registration of these terminals as respective control objects for a plurality of functions of the terminals. List registration part judges whether the information terminal detected by information terminal detecting part has plural functions. When the information terminal has plural functions, the information terminal is registered in the terminal registration list classified for at least two of the functions.

20 Claims, 5 Drawing Sheets (A)

(B)

INFORMATION TERMINAL CONTROL DEVICE AND METHOD

CROSS-REFERENCE TO RELATED APPLICATION

This application claims priority from Japanese Patent Application No. 2005-212856 filed on Jul. 22, 2005, and Japanese Patent Application No. 2006-102770 filed on Apr. 4, 2006. The entire contents of each of these applications are incorporated herein by reference.

TECHNICAL FIELD

The present invention pertains to an information terminal controller for controlling usually wireless information terminals and an information terminal control method.

BACKGROUND

A hands-free communication system is described in, for example, Japanese Kokai Patent Application No. 2003-174676. In this system, plural cell phones registered beforehand are listed and displayed on a monitor. From the displayed list, the user can select a cell phone for performing a hands-free call. Some cell phones developed in recent years have a music-play function, and a hands-free call using such a cell phone with this music-play function is also possible.

BRIEF SUMMARY OF THE INVENTION

Certain embodiments of the invention provide an information terminal controller for controlling plural information terminals in a vehicle where each terminal has at least one function. The information terminal comprises, for example, a communication link coupled to each terminal of the plural information terminals and a controller operable to judge whether plural functions exist in a connected one of the plural information terminals and operable to register the connected one as a control object for at least two of the plural functions when the connected one has plural functions.

The information terminal controller can also comprise a communication link coupled to each terminal of the plural information terminals, input means for instructing registration of one function equipped on a connected one of the plural information terminals and registration means for registering the connected one of the plural information terminals as a control object for the one function and for registering the connected one at substantially the same time as the control object for each remaining unregistered function of the connected one.

Embodiments of the invention also provide an information terminal control method for controlling plural information terminals in a vehicle. Each terminal has at least one function. The method can include, for example, judging whether a respective terminal of the plural information terminals has a plurality of functions and registering the respective terminal as a control object for at least two of the plurality of functions when the respective terminal has the plurality of functions.

Another method according to the invention can include connecting one of the plural information terminals to a controller via a communication link, issuing an instruction for registration of only a first function equipped on the one of the plural information terminals, registering the one of the plural information terminals as a control object for the first function in response to the instruction and registering the one of the plural information terminals as the control object for a second function equipped on the one of the plural information terminals at substantially a same time as registering the one of the plural information terminals.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

For a hands-free call system in the prior art, it is necessary to register plural cell phones as selection objects beforehand. Consequently, when a cell phone with a music-play function developed in recent years is carried into a car for use as a phone or as a music-play device, the user has to register beforehand whether the cell phone will be used as a phone or as a music-play device. This leads to complicated operation. As a result of embodiments of the invention, there is no need for the user to register the functions equipped on each information terminal individually, and the operation load on the user can be reduced.

The information terminal controller according to a first embodiment detects the various information terminals present in the wireless communicable region, classifies and lists each of the functions equipped on the detected information terminals and controls the information terminals as the control object. Then, a terminal registration list for each function is presented to the user. When the user selects an information terminal among the lists, wireless communication is performed with the selected information terminal, and data transceiving is performed.

Figure 1:
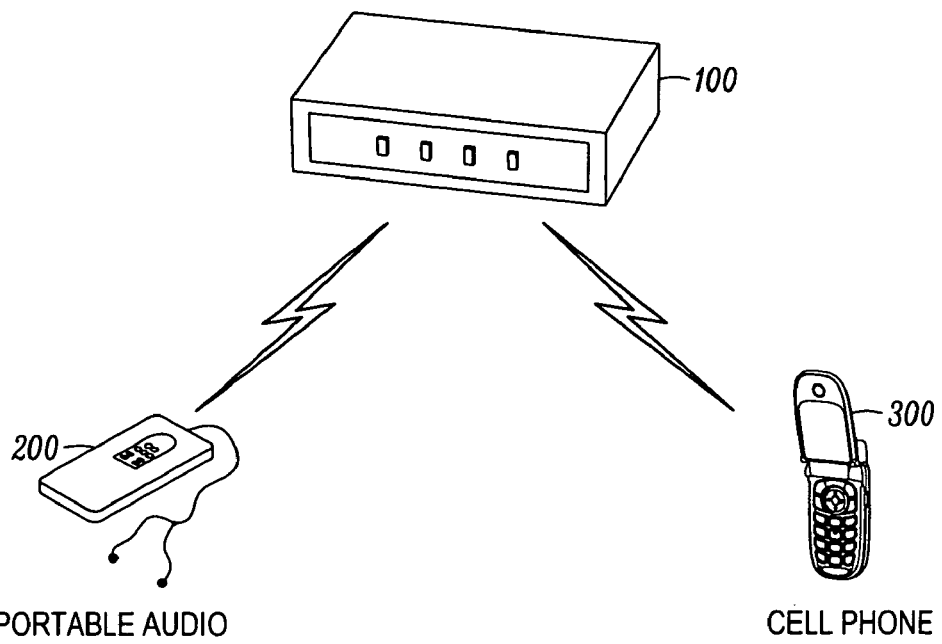
FIG. 1 is a diagram illustrating an application example of an information terminal control device.
Figure 1:
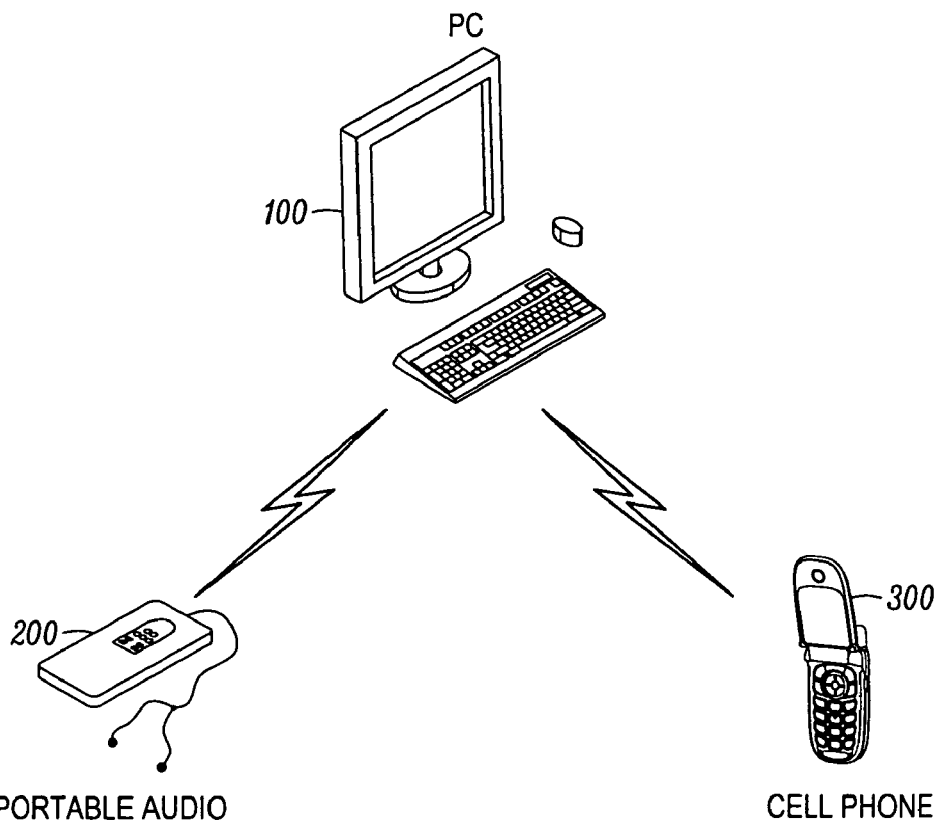

FIG. 1 is a diagram illustrating an application example of the information terminal control device, or controller. As shown in (A), information terminal controller 100 is carried in the car navigation unit onboard the vehicle. Also, as shown (B), information terminal controller 100 can also be carried in personal computer (PC) or other information equipment.

By means of wireless communication, such as Bluetooth® communication or the like, communication with various information terminals such as portable audio 200 and cell phone 300 is possible. For example, portable audio 200 is HDD audio or Flash audio, and music data, such as MP3 data, stored in an internal memory can be played.

Cell phone 300 includes not only a conventional cell phone, but also a cell phone equipped with a music-play function. Either a cell phone with only a voice-call function or a cell phone also having a music-play function in addition to the voice-call function is wireless connected. That is, cell phone 300 having plural functions may be wirelessly connected.

When music is played with wireless connected portable audio 200, information terminal controller 100 receives the music data via wireless communication, and the played music is output from speakers within the car.

Also, the voice-call function of cell phone 300 may be used, that is, cell phone 300 may be used as a hands-free telephone set. If connected cell phone 300 is a cell phone with a music-play function, just like said portable audio, the music played by cell phone 300 can be output from speakers in the car.

Figure 2:
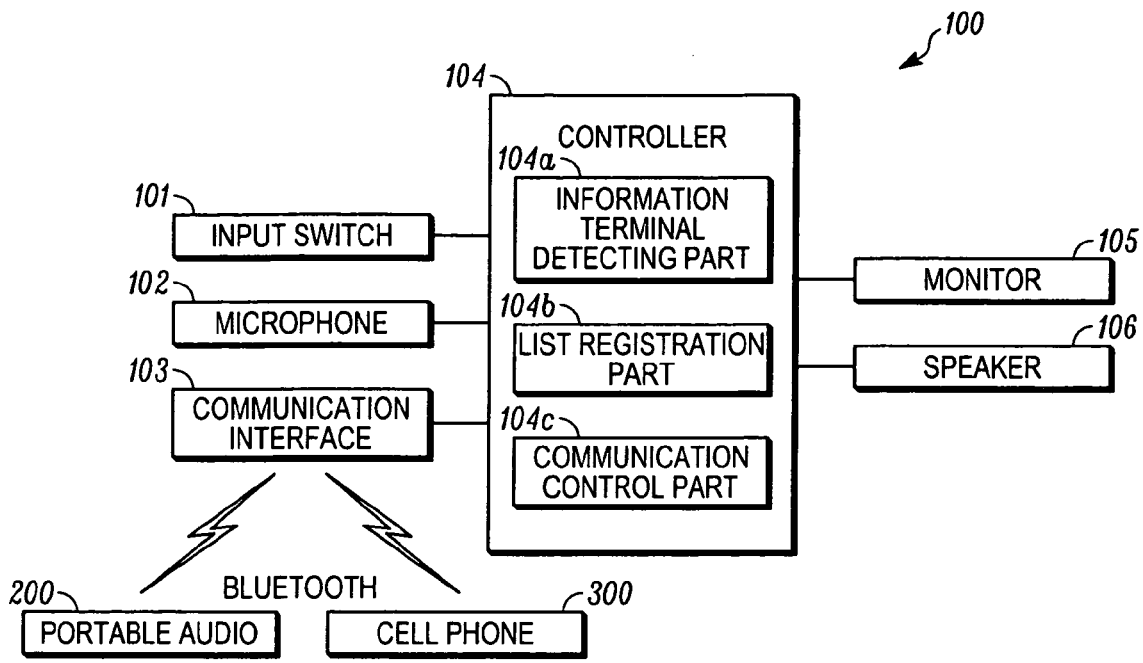
FIG. 2 is a simplified block diagram illustrating a first embodiment of an information terminal control device.

FIG. 2 is a block diagram illustrating the first embodiment. Information terminal controller 100 has an input switch 101 operated by the user, microphone 102 that inputs the voice of the user when a hands-free call is performed using cell phone 300, communication interface 103 that performs wireless communication with portable audio 200, cell phone 300 or other peripheral information terminals, controller 104 that is composed of a CPU, memory, and other peripheral circuits and performs various types of control to be explained later, monitor 105 that displays various types of menu pictures and the terminal registration list to be explained later and speakers 106 that output the music played by portable audio 200 or cell phone 300, or the voice of the other party of a call when a hands-free call is performed using cell phone 300.

As shown, controller 104 has information terminal detecting part 104a, list registration part 104b and communication control part 104c. The functions of each of these parts are discussed in detail herein.

When the user operates input switch 101 to instruct registration of a wireless communicable information terminal as a new control object, information terminal detecting part 104a uses communication interface 103 to detect unregistered information terminals in the terminal registration list present in the wireless communicable region.

Also, each information terminal has a unique identification terminal ID, name of the information terminal and function information indicating functions of the terminal as the terminal data. Information terminal detecting part 104a acquires terminal data from an information terminal present in the communicable region. Then, judgment is made on whether the terminal ID contained in the acquired terminal data is in agreement with the terminal ID of an information terminal that has been registered in the terminal registration list, and judgment is made on whether or not the information terminal present in the wireless communicable region is registered.

When information terminal detecting part 104a detects an unregistered information terminal in the terminal registration list, list registration part 104b registers the terminal name of the information terminal in the terminal registration list for each of the functions equipped on the information terminal based on the function information contained in the terminal data acquired from the information terminal in the described treatment. In addition to performing the function of registration, list registration part 104b also performs judging functions as described herein.

As an example of registration, when the detected unregistered information terminal is HDD audio, it is possible to acquire "HDD disk" as the information terminal name and to acquire "audio" as the function information. Consequently, for example, "HDD disk" 3a is registered in the audio registration list shown in (B) of FIG. 3, which is a Bluetooth® list, by example.

On the other hand, when the unregistered information terminal detected by information terminal detecting part 104a is a cell phone equipped with a music-play function, it is possible to acquire "cell phone" as the information terminal name, and it is possible to acquire "cell phone" and "audio" as the function information.

In the terminal registration list in these embodiments, it is possible for the user to change the terminal name. For example, the user can register the detected cell phone equipped with the music-play function with the name "dad's cell phone".

Figure 3:
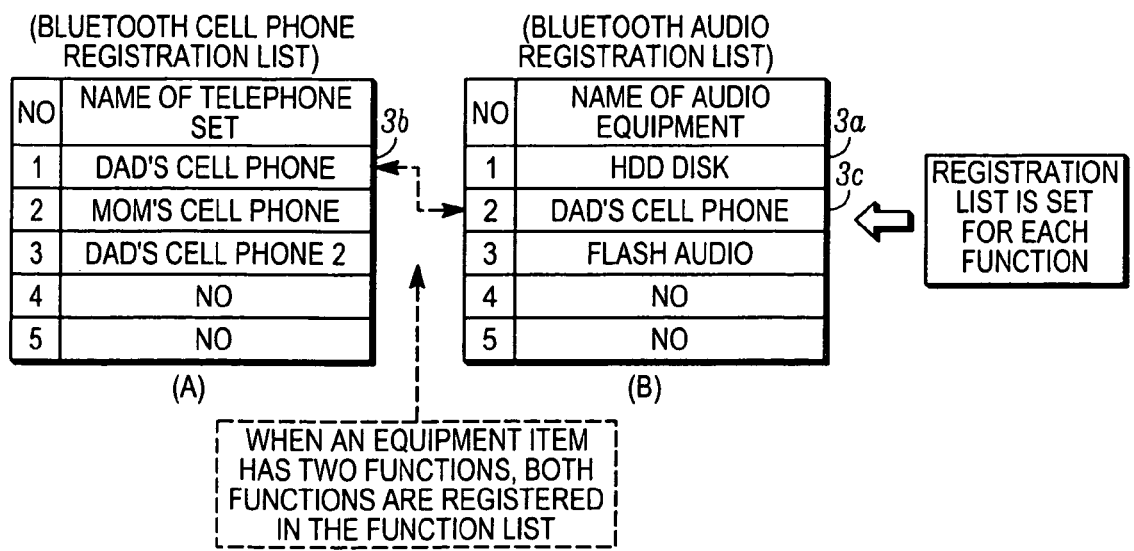
FIG. 3 is a diagram illustrating an example of a terminal registration list.

As a result, "dad's cell phone" 3b and 3c can be registered in both the cell phone registration list shown in (A) of FIG. 3 and the audio registration list shown in (B) of FIG. 3.

The terminal registration lists shown in FIG. 3 are examples where up to 5 information terminals can be registered for each of the functions. However, the present invention is not limited to this scheme. For example, one may register six or more prescribed information terminals. That is, there is no limit on the number of information terminals that can be registered.

Figure 4:
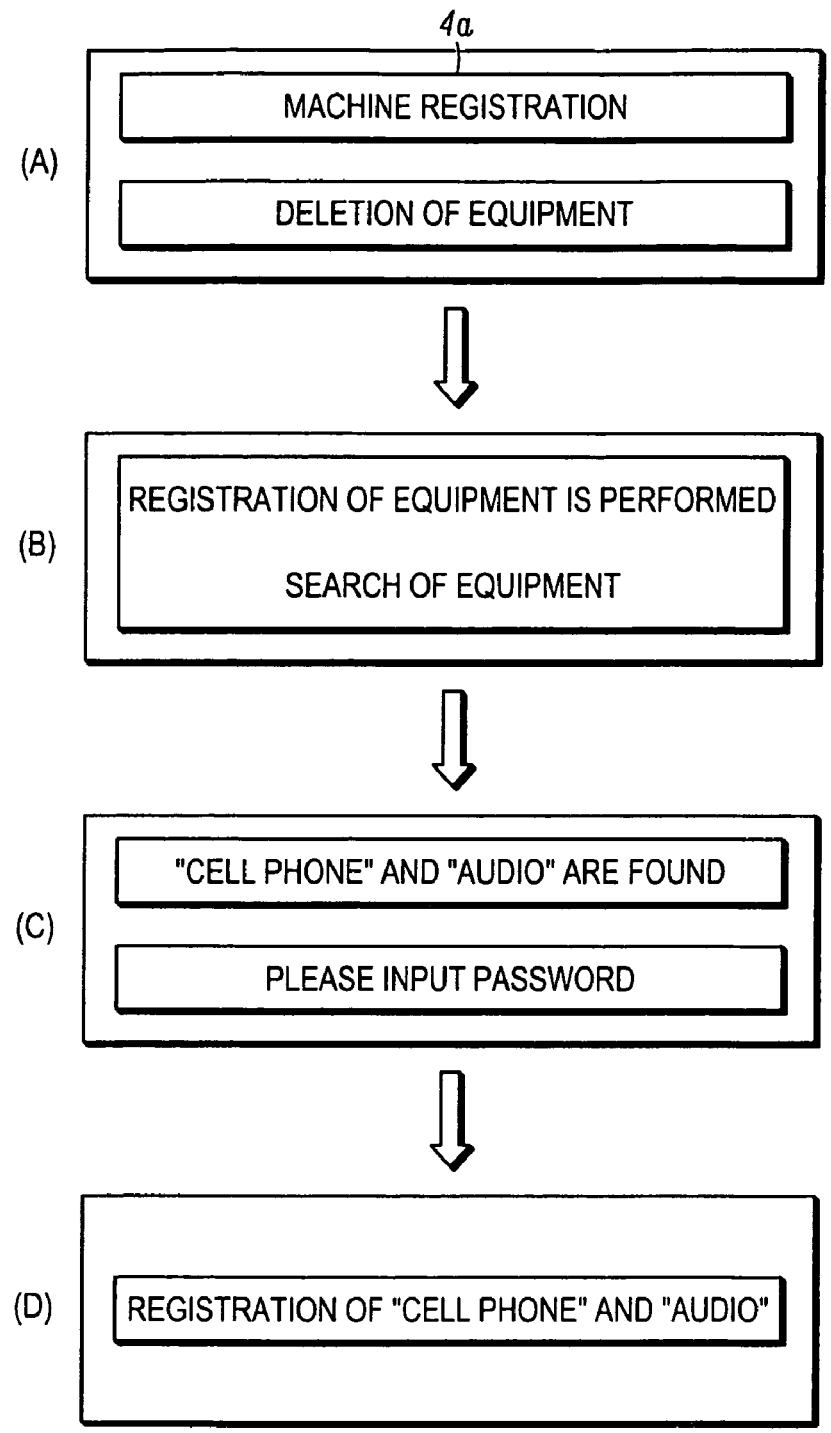
FIG. 4 is a diagram illustrating screen transition in the case of registering the information terminal in the terminal registration list according to FIG. 3.

FIG. 4 is an example of the transition of pictures displayed on monitor 105 that illustrate the information terminals in the terminal registration lists.

First, on the picture shown in (A) of FIG. 4, the user uses input switch 101 to select "registration of equipment" button 4a to instruct registration of an unregistered information terminal. When the user presses "registration of equipment" button 4a for selection, and detection of information terminals is started with information terminal detecting part 104a, the guidance picture shown in (B) is displayed, which indicates that searching of information terminals is being performed.

As searching of information terminals by information terminal detecting part 104a comes to an end, and an unregistered information terminal has been detected as shown in (C), the terminal name of the information terminal is displayed, and the detection result is noticed to the user.

In the example display shown in (C), a cell phone equipped with a music-play function is detected. While the terminal name is displayed, input of a password needed for registering the new information terminal is prompted.

When the user presses input switch 101 to input the password, list registration part 104b classifies the terminal name of the information terminal for each of the functions and registers data acquired from the information terminal in the terminal registration list based on function information contained in the terminal. At the same time, a notification of the completion of registration shown in (D) is displayed as a message on monitor 105.

The terminal registration lists prepared by classifying each of the functions (one function equipped on the information terminal and other functions different from that one function) as described are stored in memory in controller 104. When there is an instruction for the start of the wireless communication with the information terminal by the user, communication control part 104c displays the terminal registration lists classified for each of the functions (function-classified terminal registration list) on monitor 105.

When the user selects an information terminal from a terminal registration list corresponding to any function, wireless communication with the information terminal is started, data are received, and treatment corresponding to the selected function is performed.

For example, when "dad's cell phone" 3b registered in the cell phone registration list is selected, communication with "dad's cell phone" 3b is started. A hands-free call function is executed. That is, voice data input via microphone 102 is output to "dad's cell phone" 3b, and the voice of the other party of the call received from "dad's cell phone" 3b is output from speakers 106.

Also, when "dad's cell phone" 3c registered in the audio registration list is selected, a call to "dad's cell phone" 3c is started, and the music data played with "dad's cell phone" 3c are received and output from speakers 106.

In this way, corresponding to the detected function information of the information terminal, registration is performed in the terminal registration lists classified automatically for each of the functions. Consequently, the user does not have to determine the functions of each information terminal, and the user does not have to add each terminal information item individually to the registration lists. This reduces the work load on the user.

Also, the user can select a terminal for starting wireless communication from the terminal registration list displayed for each of the functions equipped on the information terminal and can easily search and find the information terminal to be selected.

In addition, when the user selects the information terminal from the terminal registration list classified for a certain function, the treatment for the selected function can be performed automatically. As a result, the convenience for the user increases.

Figure 5:
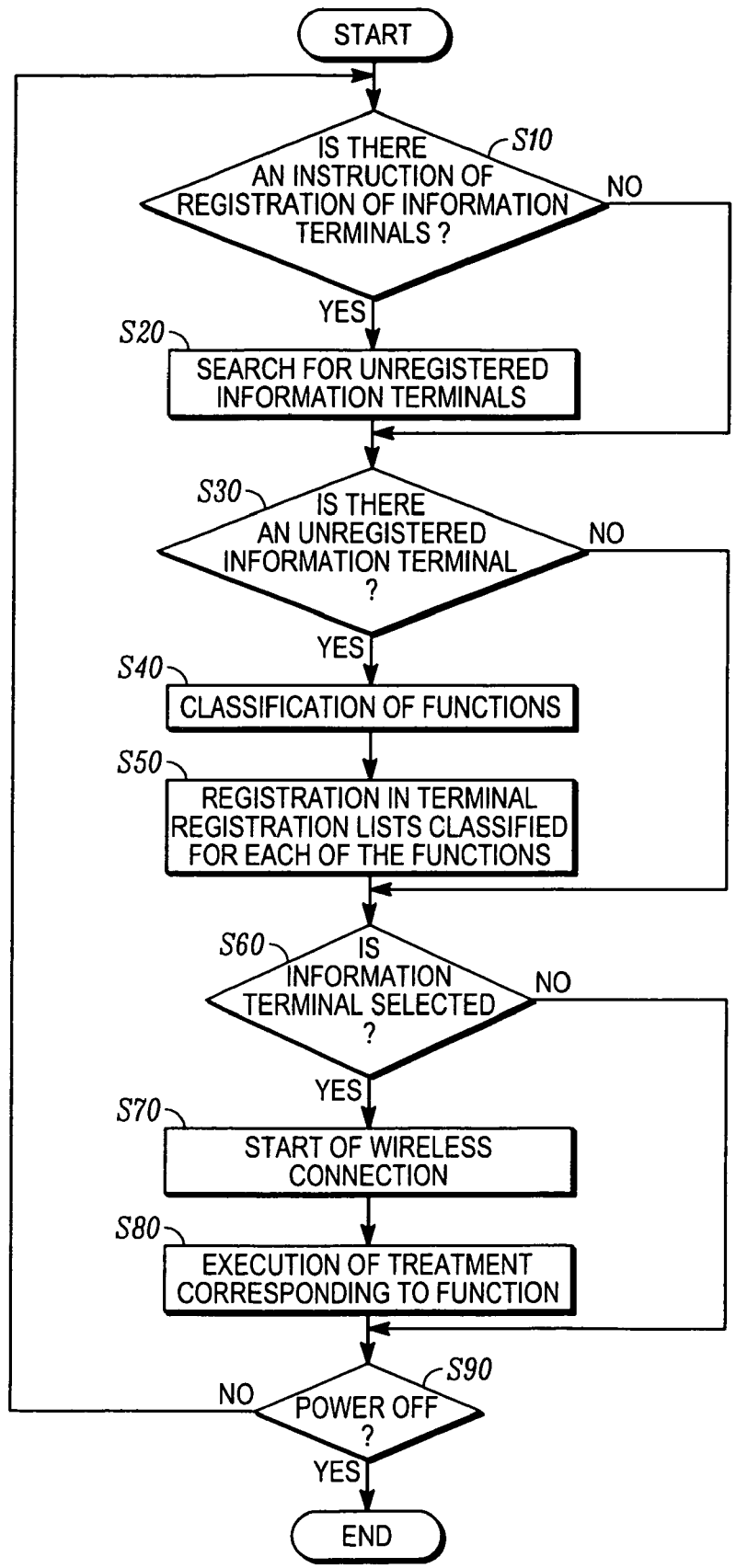
FIG. 5 is a flow chart illustrating the processing of information terminal control device 100 according to FIG. 1.

FIG. 5 is a flow chart illustrating the treatment of information terminal controller 100 according to FIG. 1. In the treatment shown in FIG. 5, when the power is turned ON for information terminal controller 100, a start program is executed by controller 104.

In step S10, when the user operates input switch 101, information terminal detecting part 104a judges whether registration of an information terminal is instructed. If registration is instructed, the process advances to step S20.

In step S20 information terminal detecting part 104a searches unregistered information terminals as explained above, and the process advances to step S30.

In step S30 information terminal detecting part 104a judges whether an unregistered information terminal is detected. When an unregistered information terminal is not detected, the process goes to step S60 to be explained later. In contrast, when an unregistered information terminal is detected, the process goes to step S40.

In step S40, based on the function information contained in the terminal data, list registration part 104b judges functions equipped on the information terminal as explained above. The process then advances to step S50.

In step S50, based on the function as judged by registration part 104b, list registration part 104b registers the detected information terminal to the terminal registration lists classified for each of the functions.

Then, the process advances to step S60, and communication control part 104c judges which information terminal is selected by the user from the terminal registration lists classified for each of the functions and displayed on monitor 105. When no information terminal is selected, the process goes to step S90. On the other hand, when a certain information terminal is selected, the process goes to step S70.

In step S70 communication control part 104c starts wireless communication via the information terminal selected by the user and communication interface 103, and the process then goes to step S80 where treatment corresponding to the terminal registration list selected by the user is executed as explained above. The process then advances to step S90.

In step S90 judgment is made on whether the power is OFF for information terminal controller 100. When the power is not turned OFF the process returns to step S10, and the treatment is repeated. On the other hand, when the power is OFF the treatment comes to an end.

In this embodiment, the following functions and effects can be realized. First, when an unregistered information terminal is detected, based on the function information of the detected information terminal, it is registered in the terminal registration list classified for each of the functions. As a result, the user does not have to determine the functions of each information terminal, and the user does not have to individually register each information terminal item in the registration list. Therefore, the operation load on the user can be reduced.

The terminal registration list classified for each of the functions is displayed on monitor 105, and the user can select any information terminal from the displayed list to instruct a wireless connection. As a result, the user can easily search and find the information terminal to be selected from the list of information terminals that displays each of the functions.

In addition, when the user selects an information terminal from the terminal registration lists classified for certain functions, the treatment can be performed automatically corresponding to the selected function. Thus, by the user simply selecting the information terminal from a list, various treatments can be performed automatically, and it is possible to improve the convenience for the user.

In this first embodiment, information terminals present in the wireless communicable region are detected. When an unregistered information terminal is detected, based on the function information contained in the terminal data of the detected information terminal, an explanation was provided herein for the case of registration on the terminal registration lists for all of the functions equipped on the information terminal.

On the other hand, according to a second embodiment, a registration menu for registering the information terminal in a terminal registration list is provided for each of the functions, the user calls out the registration menu for each of the functions, and the user registers the information terminal in a terminal registration list.

FIG. 1 illustrates an example of an information terminal controller and peripheral devices. FIG. 2 is a block diagram illustrating information terminal controller 100. FIG. 3 is a diagram illustrating an example of a terminal registration list. Since these Figures the same as those in described with respect to the first embodiment, they are not explained again.

For information terminal controller 100 in this embodiment, list registration part 104b can complete registration in all of the terminal registration lists in a single round of operation when the user calls out the registration menu for the hands-free call function and registers cell phone 300 in the cell phone registration list, or when the user calls out the registration menu for the audio function and registers cell phone 300 in the audio registration list.

Figure 6:
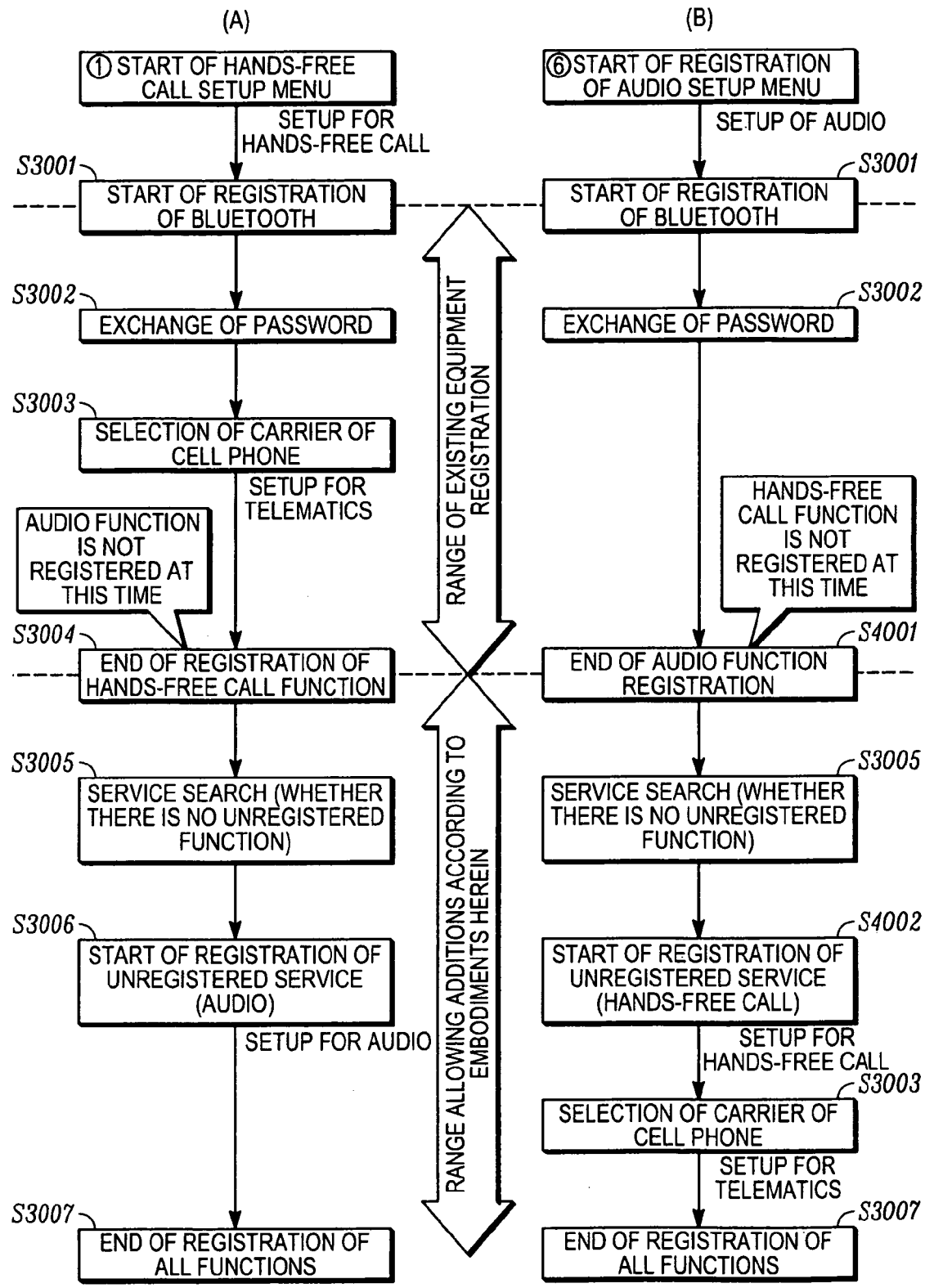
FIG. 6 is a diagram illustrating a registration sequence of a registration menu according to an alternative embodiment.

More specifically, registration is performed using the registration sequence shown in FIG. 6 where (A) illustrates a registration sequence for registration from the registration menu for the hands-free call function to the terminal registration list and (B) illustrates the registration sequence for registration from the registration menu for the audio function to the terminal registration list.

Initially, however, the conventional registration sequence on the side of cell phone 300 is first described. First, information terminal controller 100 starts registration of the audio function based on operation by the user. That is, the user operates a switch on information terminal controller 100, and calls out the registration menu for the audio function on monitor 105. The user hence calls out the registration menu for the audio function on cell phone 300, and instructs start of registration of the audio function on the registration menu. Cell phone 300 searches the equipment present in the communicable region and displays the search result on the screen. In this case, if plural equipment are present in the communicable region, all of the equipment is displayed in the list.

As a result, the user selects information terminal controller 100 from the equipment listed and a connection to information terminal controller 100 occurs. Next, cell phone 300 seeks input of a password for the user. When the user inputs the password, the cell phone 300 makes a request for exchange of password with information terminal controller 100. Upon this exchange, connection between the cell phone 300 and the information terminal controller 100 is established.

After the connection is established, information terminal controller 100 registers the information of cell phone 300 to the audio registration list, and registration of the audio function comes to an end.

With respect to FIG. 6, an additional explanation is provided for the case in which cell phone 300 performs an audio function and a hands-free call function of an information terminal. However, the same treatment can be performed in the case of an information terminal having plural functions.

According to the second embodiment of the invention, an explanation is first provided for the registration sequence of the hands-free call function shown in (A) of FIG. 6. In this registration sequence, when the user operates input switch 101 and calls out the registration menu for the hands-free call function on monitor 105, the user instructs the start of registration of the hands-free call function.

In step S3001 list registration part 104*b* starts registration (by example, Bluetooth® registration) of the hands-free call function equipped on cell phone 300 under the instruction of the user. Then, in step S3002 a password is exchanged under the request of exchange of password from cell phone 300 as explained above.

List registration part 104*b* can acquire the terminal ID of the information terminal of the other party of the communication in this case.

In step S3003 list registration part 104*b* displays a picture for selecting the carrier of the cell phone on monitor 105 to prompt the user to select the carrier of the cell phone. As a result, when the user selects the carrier of the cell phone setup of the hands-free call function corresponding to the selected carrier, such as setup of the use of telematics, is performed.

Then, list registration part 104*b* registers the terminal ID obtained in password exchange in the cell phone registration list in step S3004, and registration of the hands-free call function comes to an end.

Then, in step S3005 list registration part 104*b* executes service discovery using an SDP (service discovery protocol), such as that contained in the Bluetooth® function, and searches whether an unregistered function exists other than the hands-free call function for which cell phone 300 has been registered.

As a result, if it is detected that cell phone 300 has, for example, an audio function, registration of cell phone 300 in the audio registration list is started in step S3006. In step S3007 the terminal ID acquired in the password exchange is registered in the audio registration list, and registration of all of the functions comes to an end.

Next, an explanation is given regarding the registration sequence of the audio function shown (B) of FIG. 6.

In this registration sequence, the user operates input switch 101 and calls out the registration menu for the audio function on monitor 105. Then, under instruction of start of registration of the audio function by the user, registration is started.

Also, as shown in (B) of FIG. 6, the same step numbers as those in (A) are adopted, and the explanation will mainly deal with the different features.

In step S4001 list registration part 104*b* registers the terminal ID acquired in password exchange in the audio registration list, and registration of the audio function comes to an end.

Then, in step S3005 list registration part 104*b* executes service discovery, and unregistered functions other then the audio function equipped on cell phone 300 are searched. As a result, if it is detected that cell phone 300 has an unregistered hands-free call function in step S4002, list registration part 104*b* displays the picture for selecting the carrier of the cell phone on monitor 105 to prompt the user to select the carrier of the cell phone.

When the user selects the carrier of the cell phone, list registration part 104*b* sets up the hands-free call function such as telematics, corresponding to the selected carrier in step S3003.

In step S3007 the terminal ID acquired in password exchange is registered in the cell phone registration list, and registration of all of the functions comes to an end.

The terminal registration list prepared with classification made for each of the functions of the information terminal in the described treatment is stored in the memory of controller 104 in the same way as in the first embodiment.

In operation, when the user issues an instruction of start of the wireless communication with the information terminal, communication control part 104*c* displays the terminal registration lists classified for each of the functions on monitor 105. Then when the user selects an information terminal from the terminal registration list corresponding to a certain function, wireless communication with the information terminal is started and data are received, and treatment is performed corresponding to the selected function.

In this second embodiment, in addition to the functions and effects in the first embodiment, the following effects can be realized. First, when the registration menu for each of the functions equipped on the information terminal is used to register the information terminal in the terminal registration list, after completion of the registration for the function instructed by the user on the registration, registration for the other functions equipped on the information terminal is continued. As a result, in a single round of operation of the user, registration can be completed for all of the functions equipped on the information terminal in the corresponding terminal registration list, so that it is possible to improve the convenience.

In addition, an unregistered function equipped on the information terminal is automatically searched by executing service discovery using SDP, such as that contained in the Bluetooth® function. Thus, even if the user does not have knowledge of all of the functions equipped on each information terminal, registration of all of the functions equipped on the information terminals is still possible without missing any.

When cell phone 300 is registered in the cell phone registration list, the necessary telematics setup can be performed in a series operation. Hence, the user does not have to perform a separate operation for setup of telematics in addition to the operation of registration in the terminal registration list, and the operation of the user can be simplified.

For the information terminal controller explained in the embodiments, many modifications are possible.

In the first embodiment, for example, when the user instructs registration of information terminals, unregistered information terminals are searched, and these unregistered information terminals are then registered in the terminal registration lists. However, the invention is not limited to this scheme. Alternatively, one may also adopt a scheme in which when power is turned ON for information terminal controller 100, unregistered information terminals present in the communicable region are automatically detected.

Also in the first embodiment, in the terminal registration lists shown in FIG. 3, an information terminal equipped with plural functions, such as "dad's cell phone" having a cell phone function and an audio function, is registered in list No. 1 as the cell phone registration list, and is registered in list No. 2 as the audio registration list. That is, registration is performed using different list numbers. However, the invention is not limited to this scheme. For example, one may also adopt a scheme in which an information terminal having plural functions is registered in the same list No. (ID No.) in different terminal registration lists for each of the functions. As a result, when a single information terminal is registered in plural terminal lists the same information terminal can be controlled with the same list No., so that control of the lists becomes simpler.

In both the first and second embodiments, an explanation was provided with respect to examples in which information terminal controller 100 and various information terminals, such as portable audio 200 and cell phone 300, perform wireless connection by means of Bluetooth® communication. Once again, the invention is not limited to this scheme. One may also adopt a scheme in which other communication codes are adopted for wireless connection, or communication may be performed with a wired connection.

In the first embodiment, an example was provided in which list registration part 104b judges the functions of each information terminal based on the function information of the information terminal contained in the acquired terminal data. In the second embodiment, an example was provided in which the SDP (service discovery protocol) contained in the Bluetooth® function is used for automatic searching of the functions equipped on the information terminal of the other party of the communication. This description does not limit embodiments of the invention. For example, one may also adopt a scheme in which in the first embodiment, list registration part 104b uses the SDP to search the functions equipped on the information terminal.

Also, in the second embodiment, list registration part 104b may judge the functions equipped on each information terminal based on the function information of the information terminals contained in the acquired terminal data so that the terminal data are acquired from the various information terminals.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An information terminal control device for controlling plural information terminals in a vehicle, each of the plural information terminals having at least one function, the information terminal control device comprising:
    a communication link configured to communicate with each terminal of the plural information terminals;
    a display; and
    a controller configured to:
        store a plurality of registration lists, each of the plurality of registration lists classified for a respective function and each including those of the plural information terminals registered with the information terminal control device that perform the respective function;
        acquire at least one function of an unregistered information terminal responsive to an operator request for registration;
        register the unregistered information terminal as one of the plural information terminals registered with the information terminal control device by adding the unregistered information terminal to respective ones of the plurality of registration lists with which each function of the unregistered information terminal is classified;
        display at least one of the plurality of registration lists on the display for selection by an operator of one of the plural information terminals; and
        perform a step related to a function of a registration list on which the one of the plural information terminals is included if the one of the plural information terminals is within a communicable region of the information terminal control device.

2. The information terminal control device according to claim 1 wherein a first of the plurality of registration lists is classified for an audio function of playing audio files and a second of the plurality of registration lists is classified for a cell phone function.

3. The information terminal control device according to claim 1 wherein the controller is further configured to assign a same location to the unregistered information terminal within each registration list on which it is included.

4. An information terminal control device for controlling plural information terminals in a vehicle, each of the plural information terminals having at least one function, the information terminal control device comprising:
    a communication link configured to communicate with each terminal of the plural information terminals;
    means for storing a plurality of registration lists, each of the plurality of registration lists classified for a respective function and each including those of the plural information terminals registered with the information terminal control device that perform the respective function;
    input means for instructing registration of one function equipped on an unregistered information terminal; and
    registration means for registering the unregistered information terminal as one of the plural information terminals registered with the information terminal control device by adding the unregistered information terminal to a registration list classified for the one function and by adding the unregistered information terminal at substantially the same time to a respective one of the plurality of registration lists classified for each remaining unregistered function of the unregistered information terminal.

5. The information terminal control device according to claim 4 wherein the registration means further comprises means for searching for each remaining unregistered function of the unregistered information terminal.

6. The information terminal control device according to claim 4 wherein the one function is one of an audio function for playing audio files and a cell phone function; and wherein one unregistered function is the other of the audio function for playing audio files and the cell phone function.

7. The information terminal control device according to claim 4, further comprising:
    display means for displaying at least one of the plurality of registration lists for selection by an operator of one of the plural information terminals; and means for performing a step related to a function of a registration list on which the one of the plural information terminals is included if the one of the plural information terminals is within a communicable region of the information terminal control device.

8. An information terminal control method for controlling plural information terminals registered with an information terminal control device in a vehicle, each of the plural information terminals having at least one function, the method comprising:
    storing a plurality of registration lists, each of the plurality of registration lists classified for a respective function and each including those of the plural information terminals registered with the information terminal control device that perform the respective
    acquiring at least one function of an unregistered information terminal responsive to an operator request for registration; and
    registering the unregistered information terminal as one of the plural information terminals registered with the information terminal control device by adding the unregistered information terminal to respective ones of the plurality of registration lists with which each function of the unregistered information terminal is classified.

9. The information terminal control method according to claim 8, further comprising:
    connecting each of the plural information terminals to a controller via a wireless communication link, the controller performing the acquiring and registering for each of the plural information terminals.

10. The information terminal control method according to claim 8 wherein the at least one function of the unregistered information terminal includes at least one of an audio function of playing audio files and a cell phone function.

11. The information terminal control method according to claim 8, further comprising:
    attaching an identification number to each of the plural information terminals registered with the information terminal control device; and
    adding the identification number of the unregistered information terminal in a same position on each registration list in which it is included relative to an arrangement order of the plural information terminals on that registration list.

12. The information terminal control method according to claim 11, further comprising:
    displaying each registration list to which the unregistered information terminal is added in the arrangement order of each registration list.

13. An information terminal control method for controlling plural information terminals registered with an information terminal control device in a vehicle, each of the plural information terminals having at least one function, the method comprising:
    connecting an unregistered information terminal to a controller via a communication link;
    issuing an instruction for registration of only a first function equipped on the unregistered information terminal;
    registering the unregistered information terminal as a one of the plural information terminals registered with the information terminal control device by adding the unregistered information terminal to a first one of a plurality of registration lists classified for the first function in response to the instruction and stored in the information terminal control device, each of the plurality of registration lists classified for a respective function and each including those of the plural information terminals registered with the information terminal control device that perform the respective function; and
    adding the unregistered information terminal to a second one of the plurality of registration lists classified for a second function equipped on the unregistered information terminal at substantially a same time as adding the unregistered information terminal to the first one of the plurality of registration lists.

14. The information terminal control method according to claim 13, further comprising:
    searching for unregistered functions of the one of the plural information terminals after issuing the instruction for registration;
    displaying at least one of the plurality of registration lists on a display for selection by an operator of one of the plural information terminals; and
    performing a step related to a function of a registration list on which the one of the plural information terminals is included if the one of the plural information terminals is within a communicable region of the information terminal control device.

15. The information terminal control device according to claim 1 wherein the communication link is a wireless communication link.

16. The information terminal control device according to claim 15 wherein the controller is configured to acquire the at least one function of the unregistered information terminal through the communication link.

17. The information terminal control device according to claim 1 wherein the controller is configured to display the at least one of the plurality of registration lists by displaying each of the plurality of registration lists on the display for selection by the operator of one of the plural information terminals on one of the plurality of registration lists.

18. The information terminal control device according to claim 7 wherein the display means displays each of the plurality of registration lists, the information terminal control device further comprising:
    means for arranging information terminals included in each of the plurality of registration lists in a predetermined order.

19. The information terminal control device according to claim 18 wherein the predetermined order is such that the unregistered information terminal registered by the registration means is assigned to a same position number in the predetermined order for each of the plurality of registration lists to which it is added.

20. The information terminal, control method according to claim 8, further comprising:
    displaying at least one of the plurality of registration lists on the display for selection by an operator of one of the plural information terminals; and
    performing a step related to a function of a registration list on which the one of the plural information terminals is included if the one of the plural information terminals is within a communicable region of the information terminal control device.

* * * * *